United States Patent [19]

Miyazoe et al.

[11] Patent Number: 5,462,770
[45] Date of Patent: Oct. 31, 1995

[54] PROCESS FOR FORMING A COATING ON A SUBSTRATE

[75] Inventors: Seigo Miyazoe, Takatsuki; Tsuneyoshi Hisai, Hirakata; Akira Fushimi, Ikoma; Kazuhiko Takeoka, Kawanishi; Yoshitaka Okude, Hirakata; Takeo Kurauchi, Neyagawa, all of Japan

[73] Assignee: Nippon Paint Co., Ltd., Osaka, Japan

[21] Appl. No.: 399,462

[22] Filed: Mar. 7, 1995

Related U.S. Application Data

[62] Division of Ser. No. 123,853, Sep. 9, 1993.

[30] Foreign Application Priority Data

Sep. 9, 1992 [JP] Japan ................. 4-240389

[51] Int. Cl.$^6$ .................. B05D 1/36; B05D 7/00
[52] U.S. Cl. .............. 427/407.1; 423/409; 423/410; 423/412.1; 525/103
[58] Field of Search .................. 427/407.1, 409, 427/410, 412.1; 525/103

[56] References Cited

U.S. PATENT DOCUMENTS

| | | | |
|---|---|---|---|
| 5,063,114 | 11/1991 | Nambu et al. | 525/103 X |
| 5,143,451 | 9/1992 | Ohta et al. | 523/435 |
| 5,225,248 | 7/1993 | Stephenson | 427/407.1 X |
| 5,262,506 | 11/1993 | Okawa et al. | 528/27 |
| 5,322,714 | 6/1994 | Kato et al. | 427/407.1 |
| 5,330,796 | 7/1994 | Kasari et al. | 427/407.1 |
| 5,356,670 | 10/1994 | Briggs et al. | 427/410 |
| 5,397,603 | 3/1995 | Okuda et al. | 427/407.1 |
| 5,399,384 | 3/1995 | Fushimi et al. | 427/407.1 |

*Primary Examiner*—Michael Lusignan
*Attorney, Agent, or Firm*—Townsend & Banta

[57] ABSTRACT

The present invention provides a low viscosity curable resin composition and coating composition containing the same which has a decreased solvent content. The coating composition provides a cured film having not only excellent acid resistance but also good weather resistance and mar resistance without an adverse effect to the environment. The curable resin composition comprises (a) a hydroxyl and carboxyl group containing silicone polymer, (b) a carboxyl and carboxylate group containing polymer, and (c) a hydroxyl and epoxy group containing polymer.

1 Claim, No Drawings

PROCESS FOR FORMING A COATING ON A SUBSTRATE

CROSS REFERENCE TO A RELATED APPLICATION

This is a divisional application of co-pending application Ser. No. 08/123,853 filed Sep. 9, 1993.

FIELD OF THE INVENTION

The present invention relates to a curable resin composition which is suitable for automotive top coating composition and coil coating composition, and to coating composition containing the same.

BACKGROUND OF THE INVENTION

A top coating composition for automobiles generally contains, as a film forming binder, a combination of a hydroxyl group containing polymer and a melamine curing agent. The cured film obtained from the melamine curing system, however, has poor acid resistance and is damaged by acid rain which has recently become one of serious problems. The damage of the film provides poor appearance, and a top coating composition having improved acid resistance has been demanded.

In order to overcome the above mentioned defects, the present inventors have proposed novel coating compositions without employing the melamine curing agent in Japanese Patent Kokai Publications 45577/1990, 287650/1991. The similar coating compositions are also disclosed in U.S. Pat. No. 2,977,334 (to Zopf et al.), 3,399,109 (to Zimmerman et al.) and 3,528,935 (to Marion et al.). The proposed coating composition cures by means of the reaction of acid with epoxy and therefore has good acid resistance and sufficient weather resistance for an automotive top coating application.

On the other hand, a high solid type of paint which contains decreased amount of solvent has been desired in recent years, for reducing a problem of air pollution. However, the prior art coating composition have a high viscosity due to their high functional group concentration and they have to contain fairly large proportion of solvent to attain a proper coating viscosity.

Japanese Patent Kokai Publication 64181/1990 discloses a resin composition for use in paint which contains a hydroxyl group containing polysiloxane and a cross-linking agent. Japanese Patent Kokai Publication 138228/1989 discloses a process for producing a hydroxyl group containing polysiloxane. However, the disclosed paints have too poor acid and mar resistance for use as an automotive top coating.

It is therefore desired to develop the top coating composition which has an excellent acid and mar resistance, and a decreased solvent content.

SUMMARY OF THE INVENTION

The present invention provides a high solid curable resin composition which provides cured film having an excellent acid, weather and mar resistance. The present invention also provides a process for forming a coating film using the resin composition.

The present invention thus provides a curable resin composition comprising the following components:

(a) from about 5 to 50% by weight of a hydroxyl and carboxyl group containing silicone polymer prepared by half esterifying:

(i) a hydroxyl group containing silicone polymer having an average of 3 to 12 hydroxyl groups per molecule of the formula:

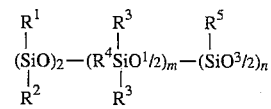

wherein, $R^1$ represents a methyl, phenyl or phenylethyl group, $R^2$ and $R^3$ each independently represents a methyl, phenyl, phenylethyl, 3-hydroxypropyl or 3-(hydroxyethoxy)propyl group, $R^4$ represents a methyl, 3-hydroxypropyl or 3-(hydroxyethoxy)propyl group, $R^5$ represents a methyl, phenyl, phenylethyl or isobutyl group, l represents an integer of 1 to 20, m represents an integer of 2 to 4, and n represents an integer of 0 to 2; with (ii) an anhydride group containing compound; in such an amount that a molar ratio of the hydroxyl group to the anhydride group is 1/1.0 to 1/0.2;

(b) from about 20 to 60% by weight of a carboxyl and carboxylate group containing polymer prepared by reacting:

The present invention also provides a process for forming a coating on a substrate comprising: forming a primer coating or optionally further forming an intercoating on a substrate; coating a water-borne or solvent-borne color base paint on the primed or intercoated substrate; coating a clear paint thereon without curing the base paint layer; and baking both the base and clear coating layers to cure; an improvement being present in that the clear paint comprising a coating composition comprising the following components:

(a) from about 5 to 50% by-weight of a hydroxyl and carboxyl group containing silicone polymer prepared by half esterifying:

(i) a hydroxyl group containing silicone polymer having an average of 3 to 12 hydroxyl groups per molecule of the formula:

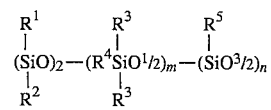

wherein, $R^1$ represents a methyl, phenyl or phenylethyl group, $R^2$ and $R^3$ each independently represents a,methyl, phenyl, phenylethyl, 3-hydroxypropyl or 3-(hydroxyethoxy)propyl group, $R^4$ represents a methyl, 3-hydroxypropyl or 3-(hydroxyethoxy)propyl group, $R^5$ represents a methyl, phenyl, phenylethyl or isobutyl group, l represents an integer of 1 to 20, m represents an integer of 2 to 4, and n represents an integer of 0 to 2; with (ii) an anhydride group containing compound; in such an amount that a molar ratio of the hydroxyl group to the anhydride group is 1/1.0 to 1/0.2;

(b) from about 20 to 60% by weight of a carboxyl and carboxylate group containing polymer prepared by reacting:

(i) an anhydride group containing polymer prepared by copolymerizing: (1) from about 15 to 40% by weight of an ethylenically unsaturated monomer having an anhydride group; and (2) from about 60 to 85% by weight of another copolymerizable ethylenically unsaturated monomer; with (ii) a hydroxyl group containing compound having 1 to 12 carbon atoms; in such an amount that a molar ratio of anhydride group to hydroxyl group is from about 1/1.5 to 1/1; and (c) from about 30 to 60% by weight of a hydroxyl and epoxy group containing polymer prepared by copolymerizing:

(i) from about 5 to 40% by weight of a hydroxyalkyl (meth)acrylate of the formula:

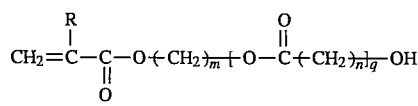

wherein, R represents a hydrogen atom or a methyl group, m represents an integer of 2 to 8, n represents an integer of 3 to 7, and q represents an integer of 0 to (i) an anhydride group containing polymer prepared by copolymerizing: (1) from about 15 to 40% by weight of an ethylenically unsaturated monomer having an anhydride group; and (2) from about 60 to 85% by weight of another copolymerizable ethylenically unsaturated monomer; with (ii) a hydroxyl group containing compound having 1 to 12 carbon atoms; in a molar ratio of the anhydride group to the hydroxyl group is from about 1/1.5 to 1/1; and (c) from about 30 to 60% by weight of a hydroxyl and epoxy group containing polymer prepared by copolymerizing:

(i) from about 5 to 40% by weight of a hydroxyalkyl (meth)acrylate of the formula:

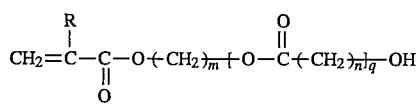

wherein, R represents a hydrogen atom or a methyl group, m represents an integer of 2 to 8, n represents an integer of 3 to 7, and q represents an integer of 0 to 4;

(ii) from about 10 to 60% by weight of an ethylenically unsaturated monomer having an epoxy group; and optionally (iii) from about 0 to 85% by weight of another copolymerizable ethylenically unsaturated monomer. 4;

(ii) from about 10 to 60% by weight of an ethylenically unsaturated monomer having an epoxy group; and optionally (iii) from about 0 to 85% by weight of another copolymerizable ethylenically unsaturated monomer.

DETAILED DESCRIPTION OF THE INVENTION

The hydroxyl and carboxyl group containing silicone polymer (a) employed in the curable resin composition of the present invention may be provided by half esterifying a hydroxyl group containing silicone polymer (a)(i) with an anhydride group containing compound (a)(ii).

An example of a preparation process for the hydroxyl group containing silicone polymer (a)(i) employed in the present invention is disclosed in an abstract of the Organic Silicon Material Chemistry Symposium, 1990, pages 29 to 30. Some of these are commercially available under a trade name of "KR-2001" series from Shinetsu Silicone Co. or under a trade name of "NVC-Silicone" series from Nippon UNICAR LTD. of the formula, respectively:

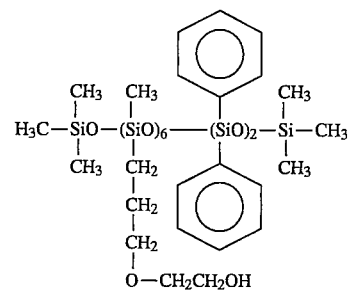

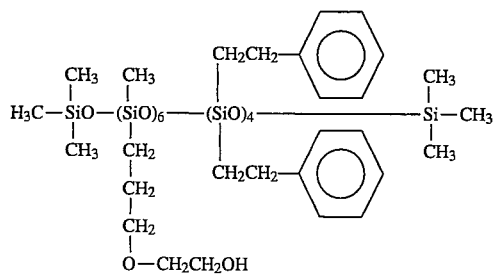

The hydroxyl group containing silicone polymer (a)(i) has 3 to 12, preferably 5 to 10 hydroxyl groups per molecule. If the polymer (a)(i) has less than 3 hydroxyl groups per molecule, the resulting resin composition may have poor curability. If the polymer (a)(i) has more than 12 hydroxyl groups per molecule, the resulting resin composition may have too high viscosity to provide high solid coating composition.

The anhydride group containing compound (a)(ii) employed in the present invention may be any compound which provides carboxyl functionality by reacting with a hydroxyl group. The compound (a)(ii) preferably has saturated or unsaturated cyclic group having 8 to 12 carbon atoms, because such a compound may impart improved compatibility to the resulting polymer. Specific examples of the preferred anhydride group containing compound include hexahydrophthalic anhydride, phthalic anhydride, 4-methylhexahydrophthalic anhydride, tetrahydrophthalic anhydride and trimellitic anhydride.

Half esterification reaction of the hydroxyl group containing silicone polymer (a)(i) with the anhydride group containing compound (a)(ii) may be carried out according to any process known to the art, for example, at a temperature of from room temperature to 120° C. over 30 minutes to 8 hours. If the reaction is conducted over long period at high temperature over 120° C., polycondensation is occurred to form silicone polyester. Such a silicone polyester has too high viscosity due to its high molecular weight to provide high solid coating composition, and has too low functionality for the purpose of the coating composition of the present invention.

It is preferred that a molar ratio of the hydroxyl group in the polymer (a)(i) to the anhydride group in the compound (a)(ii) employed in the reaction is 1/1.0 to 1/0.2. If the molar ratio is more than 1/0.2, the resulting coating composition may have poor water resistance. If the molar ratio is less than 1/1.0, unreacted anhydride will present in the resulting coating system, and it may cause undesired side reaction.

The resulting hydroxyl and carboxyl group containing polymer (a) of the present invention preferably has a number average molecular weight between 500 to 6000, preferably 1000 to 4500. If the molecular weight is less than 500, the resulting coating composition may have insufficient curability. If the molecular weight is more than 6000, such a polymer may have too high viscosity to provide the high solid coating composition.

The polymer (a) of the present invention preferably has a hydroxyl value of 2 to 120, more preferably 10 to 80 mgKOH/g, and an acid value of 20 to 180, more preferably 35 to 150 mgKOH/g based on the solid content.

If the hydroxyl value is less than 2 mgKOH/g, the resulting coating composition may have insufficient curability. If the hydroxyl value is more than 120 mgKOH/g, compatibility of the resulting polymer may deteriorate. If the acid value is less than 20, the resulting coating composition may have poor curability. If the acid value is more than 180, the resulting coating composition may have too high viscosity to provide the high solid coating composition. The molecular weight of the polymer employed in the present invention is a number average molecular weight (Mn), which is determined by GPC method.

The carboxyl and carboxylate group containing polymer (b) employed in the curable resin composition of the present invention is a polymer having a half ester group which is prepared by reacting an anhydride group containing polymer (b)(i) with a hydroxyl group containing compound (hydroxyl compound) (b)(ii).

The anhydride group containing polymer (b)(i) is prepared by copolymerizing 15 to 40%, preferably 15 to 30% by weight of an ethylenically unsaturated monomer having an anhydride group (b)(i)(1), and 60 to 85%, preferably 70 to 85% by weight of another copolymerizable ethylenically unsaturated monomer (b)(i)(2). If the amount of the ethylenically unsaturated monomer (b)(i)(1) is less than 15% by weight, curability of the resulting coating composition may become insufficient.

Another copolymerizable ethylenically unsaturated monomer (b)(i)(2) may be any monomer which do not adversely affect the anhydride group. It is preferred that the monomer (b)(i)(2) has one ethylenically unsaturation and 3 to 15, preferably 2 to 12 carbon atoms.

More than two monomers may also be used in combination as the monomer (b)(i)(2) in order to improve compatibility with the other polymers. Specific examples of the monomer include ethylenically unsaturated monomers such as stylene, α-methylstyrene, (meth)acrylates (e.g., methyl (meth)acrylate, ethyl (meth)acrylate, propyl (meth)acrylate, n-, i- and t-butyl (meth)acrylate, 2-ethylhexyl (meth)acrylate, lauryl (meth)acrylate and cyclohexyl (meth)acrylate and the like), "VeoVa-9" and "VeoVa-10" available from Shell Chemical Co. Ethylenically unsaturated monomers having a carboxyl group such as acrylic acid and methacrylic acid can be employed. When styrene is employed as the monomer (b)(i)(2), the amount of 5 to 40% by weight is particularly preferred.

The polymerization may be conducted in a solution, for example, at a temperature of 100 to 150° C. for 3 to 8 hours by the use of an azoic or peroxidic radical polymerization initiator. The other additives such as chain transfer agent may also be employed. The resulting anhydride group containing polymer preferably has a number average molecular weight of 1500 to 8000, more preferably 2000 to 5000. If the number average molecular weight is more than 8000, a viscosity of the polymer elevates and a high solid coating composition hardly be obtained. If the number average molecular weight is less than 1500, curability of the resulting coating may be insufficient.

The polymer thus obtained has an average of at least two, preferably 2 to 15 anhydride groups per molecule. If the number of anhydride groups is average less than 2, the resulting resin composition may have poor curability. If the number is average more than 15, a hard and brittle coating having poor weather resistance may be provided.

The anhydride group containing polymer (b)(i) is then reacted with the hydroxyl compound (b)(ii) in such an amount that a molar ratio of the anhydride group to the hydroxyl group is 1/1.5 to 1/1, preferably 1/1.5 to 1/1.3 to produce the carboxyl and carboxylate group containing polymer (b). If the molar ratio less than 1/1.5 is employed, an excessive alcohol may generate pinholes in the cured coating. If the molar ratio more than 1/1 is employed, the storage stability of the coating composition may be lowered due to unreacted anhydride groups.

Preferably, the hydroxyl compound (b)(ii) employed in the present invention is a volatile low molecular weight one and generally has 1 to 12, preferably 1 to 8 carbon atoms. Upon heating the carboxyl and carboxylate group containing polymer (b) for ring-closing the half-esterified anhydride group, a generated low molecular weight hydroxyl compound will volatile, and this removal of the hydroxyl compound out from the system ensures a high reproducibility of the ring-closed anhydride group in the polymer. Typical examples of the hydroxyl compound are methanol, ethanol, n-propanol, i-propanol, n-butanol, i-butanol, t-butanol, ethylene glycol monomethyl ether, ethylene glycol monoethyl ether, dimethylamino ethanol, diethylamino ethanol, acetol, allyl alcohol and propargyl alcohol. Preferred are acetol, allyl alcohol, propargyl alcohol and methanol.

The hydroxyl and epoxy group containing polymer (c) employed in the curable resin composition of the present invention preferably has an average of 2 to 10, more preferably average 3 to 8 epoxy groups, and an average of 2 to 12, preferably an average of 4 to 10 hydroxyl groups. It is preferred that the polymer (c) has an epoxy equivalent of 100 to 800, specifically 200 to 600, and a hydroxyl value of 200 to 1200, specifically 400 to 1000.

If the epoxy equivalent is more than 800, the resulting coating composition may have poor curability. If the epoxy equivalent is less than 100, the cured coating composition may become hard and brittle. If the hydroxyl value is less than 200, water resistance of the cured coating may deteriorate. If the hydroxyl value is more than 1200, the resulting coating composition may have poor curability.

The hydroxyl and epoxy group containing polymer (c) is prepared by copolymerizing: 5 to 40%, preferably 15 to 30% by weight of the hydroxyalkyl (meth)acrylate (c)(i) of the formula:

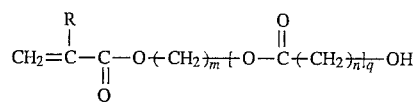

wherein, R represents a hydrogen atom or a methyl group, m represents an integer of 2 to 8, n represents an integer of 3 to 7, and q represents an integer of 0 to 4; 10 to 60%, preferably 15 to 50% by weight of an ethylenically unsaturated monomer having epoxy group (c)(ii); and optionally 0 to 85%, preferably. 10 to 60% by weight of another copolymerizable ethylenically unsaturated monomer (c)(iii).

If the amount of the hydroxyalkyl (meth)acrylate (c)(i) is less than 5% by weight, curability of the resulting coating composition may become insufficient. If the amount is more than 40% by weight, the resulting polymer (c) may have too high hydroxyl value, and may have poor compatibility with the other polymers. If the amount of the ethylenically unsaturated monomer having epoxy group (c)(ii) is less than 10% by weight, curability of the resulting coating composition may become insufficient. If the amount is more than 60% by weight, a hard and brittle coating having poor weather resistance may be provided.

A hydroxyalkyl chain of the hydroxyalkyl (meth)acrylate (c)(i) of the present invention has 4 to 20, more preferably 4 to 10 carbon atoms. If the hydroxyalkyl chain is shorter than 4 carbon atoms, too dense crosslinking may be provided and the mar resistance of the resulting coating may be lowered, because the resulting coating may become too hard. If the hydroxyalkyl chain is longer than 20 carbon atoms, too coarse crosslinking may be provided and the physical strength of the resulting coating may be lowered.

Specific examples of the hydroxyalkyl (meth)acrylate include 4-hydroxybutyl (meth)acrylate, 6-hydroxyhexyl (meth)acrylate and ε-caprotactone reactants thereof, as well as ε-caprolactone reactant of 2-hydroxyethyl (meth)acrylate and the like. These compounds are commercially available. For example, 4-hydroxybutyl acrylate is available under a trade name of "4HBA" form Mitsubishi Kasei K.K. The ε-caprolactone reactants thereof are commercially available from Daicel Chemical Industries, Ltd under a trade name of "Placcel FM-1" and "Placcel FA-1". These compounds may otherwise be prepared by esterification of (meth)acrylic acid with large excess amount of diols such as, for example, 1,4-hexane diol and 1,6-hexane diol.

Typical examples of the ethylenically unsaturated monomer having epoxy group (c)(ii) are glycidyl (meth)acrylate and 3,4-epoxycyclohexyl (meth)acrylate. The monomer (c)(iii) is the same as the copolymerizable ethylenically unsaturated monomer (b)(i)(2) as explained in the anhydride group containing polymer (b)(i) other than hydroxyl functional monomers.

The polymerization may be conducted by methods known to the art, for example, radical solution polymerization. It is generally conducted at a temperature of 100° to 150° C. for 3 to 8 hours by the use of the radical polymerization initiator. The radical polymerization initiator can be used in an amount of 3 to 15% by weight based on the total monomer weight. In the polymerization, an additive, such as chain transfer agent may be employed. The hydroxyl and epoxy group containing polymer (c) preferably has a number average molecular weight of 500 to 8000, more preferably 500 to 5000.

The curable resin composition of the present invention is prepared by mixing the above mentioned hydroxyl and carboxyl group containing silicone polymer (a), carboxyl and carboxylate group containing polymer (b) and hydroxyl and epoxy group containing polymer (c).

The composition may be made in such an amount ratio that a molar ratio of the total acid group in the polymer (a) and the polymer (b) to the epoxy group in the polymer (c) is within the range of 1/1.2 to 1/0.6, preferably 1/1.0 to 1/0.8. If the molar ratio is more than 1/0.6, the cured coating has poor curability. If it is less than 1/1.2, the cured coating easily becomes yellow.

The composition may also be made in such an amount ratio that a molar ratio of acid group in the polymer (b) to total hydroxyl group in the polymers (a) and (c) is within the range of 1/1.5 to 1/0.3, preferably 1/1.2 to 1/0.5. If the amount ratio is more than 1/0.3, the resulting coating has poor curability. If it is less than 1/1.5, the cured coating composition has poor water resistance due to the presence of excess hydroxyl groups.

The above mentioned molar ratios can be easily calculated by the methods known to the art from hydroxyl value, acid value and epoxy equivalent of the employed polymers. It is preferred that the curable resin composition of the present invention contains 5 to 50%, preferably 8 to 40% by weight of the polymer (a), 20 to 60%, preferably 30 to 50% by weight of the polymer (b) and 30 to 60%, preferably 30 to 50% by weight of the polymer (c).

If the amount of the polymer (a) is less than 5% by weight, mar resistance of the coating becomes poor, and is more than 50% by weight, too soft coating having poor acid resistance may be provided. If the amount of the polymer (b) is less than 20% by weight, acid resistance of the coating becomes poor, and is more than 60% by weight, too hard coating may be provided. The polymer (c) is employed in a calculated amount corresponding to the total amount of carboxyl group in the resulting composition. If the amount of the polymer (c) is less than the calculated amount, curability of the coating composition becomes insufficient, and is more than the calculated amount, yellow resistance of the resulting coating may become poor.

In the curable resin composition of the present invention, a carboxyl group and a carboxylate group in the polymer (b) are ring-closed upon heating to form an anhydride group and a low molecular weight free hydroxyl compound. The anhydride group then reacts with a hydroxyl group present in the polymer (a) or (c) to form a crosslinked bond to reproduce an acid group. The reproduced acid group in the polymer (b) or an acid group present in the polymer (a) reacts with an epoxy group present in the polymer (c) to form another crosslinked bond. As a result, the three polymers (a), (b) and (c) are crosslinked together during curing. The low molecular weight free hydroxyl compound which have been produced with the anhydride group is removed by evaporation upon heating.

In the present composition, since the polymer (a), the polymer (b) and the polymer (c) reacts each other to provide cured coating having high crosslinking density. It is believed that, since a Si—O—Si bond present in the polymer (a) has low free energy due to its high rotating mobility, a low viscosity of the coating composition is attained. The low free energy of the Si—O—Si bond relax an impact applied to the coating, it increases an extensibility of the coating and provides excellent mar resistance to the coating.

The curable resin composition of the present invention may further contain a curing catalyst for promoting the reaction between acid and epoxy. Typical examples of the curing catalysts are quaternary ammonium salts, such as benzyltriethylammonium chloride or bromide, tetrabutylammonium chloride or bromide, tetrabutylammonium salicylate or glycolate; sulfonates, such as p-toluenesulfonate and the like.

The curing catalyst may be present in the resin composition in an amount of 0.1 to 2.0% by weight based on the solid content of the resin composition. The curing catalyst may be combined with tin catalysts which are artknown (see Japanese Kokai Publications 151651/1990 and 279713/1990). Examples of the tin catalysts are dimethyltin bis(methyl maleate), dimethyltin bis(ethyl maleate), dimethyltin bis(butyl maleate), dibutyltin bis(butyl maleate) and the like. An amount ratio of curing catalyst/tin catalyst may be within the range of 1/0.2 to 1/4.

The resin composition may also contain melamineformaldehyde resin and/or blocked isocyanate, in order to enhance crosslinking density and water resistance. Further, a UV absorber, a hindered amine light stabilizer and anti oxidizing agent may be added to enhance weather resistance. The composition may also contain other additives, such as rheology controlling agent (e.g. crosslinked resin particles), surface controlling agent. In order to adjust viscosity of the resin composition, a diluent (e.g. alcohols, such as methanol, ethanol, propanol and butanol; hydrocarbon; esters) may be added thereto.

The resin composition has carboxyl groups which are neutralized with amine to make the composition water-dispersible or water-soluble. The resin composition may be formed into aqueous resin composition.

The curable resin composition of the present invention is suitably used for a clear coating composition. The clear coating composition is generally applied on a base coating layer formed from a base coating composition which is either aqueous or solvent-borne and contains color pigment. It is also preferred that the clear coating composition is applied on the base coating layer without curing the base coating layer and then the composite layer is baked to cure (two-coat one-bake curing system).

In case where the aqueous base coating composition is employed in the two-coat one-bake system, the base coating layer, if necessary, is heated at 60° to 100° C. for 2 to 10 minutes before coating the clear coating composition. The base coating composition is generally explained in U.S. Pat. Nos. 5,151,125 and 5,183,504 which are herein incorporated. Especially, the aqueous coating composition disclosed in U.S. Pat. No. 5,183,504 is suitable in view of finish appearance and film performance.

The curable resin composition may be prepared by art-known methods, for example as enamel paint mixing ingredients by kneader or roll.

The resin composition may be applied on a substrate by spraying, brushing, dipping, roll coating, flow coating and the like. The substrate can be any one, including wood, metal, glass, fabric, plastics, plastic foam and the like. Preferred are plastics, metals (e.g. steel and aluminum) and alloys thereof. The substrate may be primed or intercoated by art-known methods if necessary.

The coating layer is generally cured by heating at a temperature of 100° to 180° C., preferably 120° to 160° C. Curing time may be varied by curing temperature, but generally for 10 to 30 minutes at a temperature of 120° to 160° C.

The film thickness of the resulting coating layer may be varied depending upon its usage, but in many cases within the range of 0.5 to 3 mil.

EXAMPLES

The present invention is illustrated by the following Examples which, however, are not to be construed as limiting the present invention to their details. The amounts herein used are "parts", unless otherwise indicated.

Preparative Examples 1 to 10

Preparative Examples 1 to 10 illustrate a preparation of the hydroxyl and carboxyl group containing silicone polymers (a) employed in the curable resin composition of the present invention.

Preparative Example 1

A reaction vessel equipped with a thermometer, a stirrer, a cooling tube, a nitrogen inlet tube and a dropping funnel was charged with 140 parts of butyl acetate, parts of KR-2001 commercially available from Shinetsu Silicone Co. of the formula:

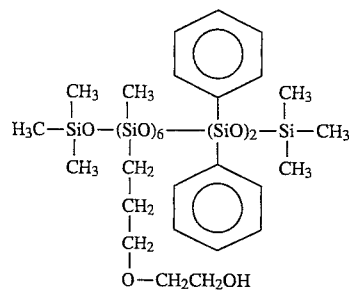

wherein, Me represents a methyl group, Ph represents a phenyl group, iBu represents an isobutyl group and A represents a 3-(hydroxyethoxy)propyl group; and 370 parts of hexahydrophthalic anhydride. A temperature of the content was raised to 125° to 130° C. and held over 2 hours. The reaction mixture was then cooled and evacuated from the vessel. After disappearance of the absorbance derived from an anhydride group (1785 cm$^{-1}$) in the infrared spectra, 206 parts of butyl acetate was added to the reaction mixture to obtain colorless clear varnish. The resulting hydroxyl and carboxyl group containing silicone polymer (polymer A-I) has a solid content of 80% and acid value of 95 mgKOH/g solid.

Preparative Examples 2 to 4

Hydroxyl and carboxyl group containing silicone polymers A-II to A-IV were prepared as described for preparative example 1, except using the compositions tabulated in the following Table 1.

Preparative Example 5

Colorless clear varnish was prepared as described for preparative example 1, except using a silicone polymer of the formula:

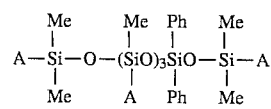

wherein, Me, Ph, iBu and A is the same identified above; and using a composition tabulated in the following Table 1. A solid content and an acid value of the resulting hydroxyl and carboxyl group containing polymer A-V are also indicated in Table 1.

Preparative Example 6

Colorless clear varnish was prepared as described for preparative example 1, except using a silicone polymer of the formula:

$$\begin{array}{c} \text{Me Ph iBu Me Me} \\ | \quad | \quad | \quad | \quad | \\ \text{A—SiOSiOSiO(SiO)}_3\text{Si—A} \\ | \quad | \quad | \quad | \quad | \\ \text{Me Ph O A Me} \\ \text{MeSiMe} \\ | \\ \text{A} \end{array}$$

wherein, Me, Ph, iBu and A is the same identified above; and using a composition tabulated in the following Table 1. A solid content and an acid value of the resulting hydroxyl and carboxyl group containing polymer A-VI are also indicated in Table 1.

Preparative Example 7

Colorless clear varnish was prepared as described for preparative example 1, except using a silicone polymer of the formula:

$$\begin{array}{c} \text{Me Ph Ph Me Me} \\ | \quad | \quad | \quad | \quad | \\ \text{MeSiO(SiO)}_2\text{(SiO)(SiO)}_4\text{Si—Me} \\ | \quad | \quad | \quad | \quad | \\ \text{Me Ph O A Me} \\ \left(\text{MeSiA}\right)_2 \\ | \\ \text{O} \\ \text{MeSiMe} \\ | \\ \text{Me} \end{array}$$

wherein, Me, Ph, iBu and A is the same identified above; and using a composition tabulated in the following Table 1. A solid content and an acid value of the resulting hydroxyl and carboxyl group containing polymer A-VII are also indicated in Table 1.

Preparative Example 8

Colorless clear varnish was prepared as described for preparative example 1, except using a silicone polymer of the formula:

$$\begin{array}{c} \text{Me Ph Me Me Me} \\ | \quad | \quad | \quad | \quad | \\ \text{MeSiO(SiO)}_2\text{(SiO)}_6\text{(SiO)}_8\text{SiMe} \\ | \quad | \quad | \quad | \quad | \\ \text{Me Ph A Me Me} \end{array}$$

wherein, Me, Ph, iBu and A is the same identified above; and using a composition tabulated in the following Table 1. A solid content and an acid value of the resulting hydroxyl and carboxyl group containing polymer A-VIII are also indicated in Table 1.

Preparative Example 9

Colorless clear varnish was prepared as described for preparative example 1, except using a silicone polymer of the formula:

$$\begin{array}{c} \quad\quad\quad\quad\quad \text{CH}_2\text{CH}_2\text{Ph} \\ \text{Me Me} \quad | \quad \text{Me} \\ | \quad | \quad\quad | \\ \text{Me—Si—(OSi)}_6\text{(OSi)}_4\text{OSi—Me} \\ | \quad | \quad\quad | \\ \text{Me A} \quad\quad \text{Me} \\ \quad\quad\quad\quad\quad \text{CH}_2\text{CH}_2\text{Ph} \end{array}$$

wherein, Me, Ph, iBu and A is the same identified above; and using a composition tabulated in the following Table 1. A solid content and an acid value of the resulting hydroxyl and carboxyl group containing polymer A-IX are also indicated in Table 1.

Preparative Example 10

Colorless clear varnish was prepared as described for preparative example 1, except using a silicone polymer of the formula:

$$\begin{array}{c} \quad\quad\quad\quad\quad \text{CH}_2\text{CH}_2\text{Ph} \\ \text{Me Me} \quad | \quad \text{Me} \\ | \quad | \quad\quad | \\ \text{Me—Si—(OSi)}_9\text{(OSi)}_6\text{OSiMe} \\ | \quad | \quad\quad | \\ \text{Me A} \quad\quad \text{Me} \\ \quad\quad\quad\quad\quad \text{CH}_2\text{CH}_2\text{Ph} \end{array}$$

wherein, Me, Ph, iBu and A is the same group as identified above; and using a composition tabulated in the following Table 1. A solid content and an acid value of the resulting hydroxyl and carboxyl group containing polymer A-X are also indicated in Table 1.

TABLE 1

| Preparative example no. | 1 | 2 | 3 | 4 | 5 | 6 | 7 | 8 | 9 | 10 |
|---|---|---|---|---|---|---|---|---|---|---|
| Obtained polymer no. | A-I | A-II | A-III | A-IV | A-V | A-VI | A-VII | A-VIII | A-IX | A-X |
| Precharged solvents | | | | | | | | | | |
| BuA*1 | 140 | 95 | 110 | | 138 | 147 | 136 | 132 | 131 | 130 |
| PGMEA*2 | | | | 114 | | | | | | |
| Silicone Polymer | 1088 | 1400 | 1200 | 1190 | 1000 | 1000 | 1000 | 1000 | 1000 | 1000 |
| Anhydride group containing compounds | | | | | | | | | | |

TABLE 1-continued

| Preparative example no. | 1 | 2 | 3 | 4 | 5 | 6 | 7 | 8 | 9 | 10 |
|---|---|---|---|---|---|---|---|---|---|---|
| HHPA*3 | 370 | 162 | 325 |  | 377 | 473 | 354 |  |  | 294 |
| PhA*4 |  |  |  | 328 |  |  |  |  |  |  |
| 4MHPA*5 |  |  |  |  |  |  |  | 317 | 313 |  |
| Dilution solvent BuA | 206 | 143 | 170 | 171 | 207 | 221 | 203 | 198 | 197 | 194 |
| Solid content (%) | 80 | 80 | 80 | 80 | 80 | 80 | 80 | 80 | 80 | 80 |
| Acid value (mg KOH/g solid) | 95 | 38 | 78 | 82 | 100 | 118 | 95 | 88 | 80 | 83 |

*1 Butyl acrylate
*2 Propylene glycol monomethyl ether acetate
*3 Hexahydrophthalic anhydride
*4 Phthalic anhydride
*5 4-Methylhexahydrophthalic anhydride Preparative Examples 11 to 14

Preparative Examples 11 to 14 illustrate a preparation of the carboxyl and carboxylate group containing polymers (b) employed in the curable resin composition of the present invention.

Preparative Example 11

A preparation of the anhydride group containing polymer (b)(i) which is a precursor of the carboxyl and carboxylate group containing polymer (b)

A reaction vessel equipped with a thermometer, a stirrer, a cooling tube, a nitrogen inlet tube and a dropping funnel was charged with 250 parts of xylene and 500 parts of Solvesso-100 (Esso), and its temperature was raised to 130° C. To the reaction vessel was dropwise added a monomer and initiator solution consisting of 215 parts of styrene, 225 parts of n-butyl acrylate, 115 parts of isobutyl methacrylate, 160 parts of itaconic anhydride, 250 parts of propylene glycol monomethyl ether acetate and 100 parts of t-butylperoxy-2-ethylhexyl hexanoate over 3 hours. The content was kept at 130° C. for 30 minutes, to which a mixture consisting of 15 parts by weight of xylene and 15 parts of t-butylperoxy-2-ethyl hexanoate was added dropwise over 30 minutes. The reactant was kept at 130° C. for 1 hours and then, 900 parts of solvent was evaporated under vacuum to obtain an anhydride group containing polymer having a solid content of 77% and a number average molecular weight of 2,300.

Preparative Example 12

A preparation of the anhydride group containing polymer (b)(i) which is a precursor of the carboxyl and carboxylate group containing polymer (b)

The anhydride group containing polymer having a solid content of 78% and a number average molecular weight of 2000 as described for preparative example 11, except using a monomer mixture comprised of 215 parts of styrene, 85 parts of 2-ethylhexyl acrylate, 200 parts of maleic anhydride.

Preparative Example 13

A preparation of the carboxyl and carboxylate group containing polymer (b)

The anhydride group containing polymer prepared in preparative example 11 (385 parts) was reacted with 45.0 parts of methanol for 24 hours at 65° C. to obtain the carboxyl and carboxylate group containing polymer B-I. Disappearance of the absorbance derived from an anhydride group (1785 cm$^{-}$) was confirmed by the infrared spectroscopy.

Preparative Example 14

A preparation of the carboxyl and carboxylate group containing polymer (b)

The anhydride group containing polymer prepared in preparative example 12 (385 parts) was reacted with 25.0 parts of methanol for 24 hours at 65° C. to obtain the carboxyl and carboxylate group containing polymer B-II. Disappearance of the absorbance derived from an anhydride group (1785 cm$^{-}$) was confirmed by the infrared spectroscopy.

Preparative Examples 15 and 16

Preparative Examples 15 and 16 illustrate a preparation of the hydroxyl and epoxy group containing polymer (c) employed in the curable resin composition of the present invention.

Preparative Example 15

A reaction vessel equipped with a thermometer, a stirrer, a cooling tube, a nitrogen inlet tube and a dropping funnel, was charged with 500 parts of butyl acetate and heated to 125° C.

To the reaction vessel was dropwise added a monomer and initiator solution consisting of 50 parts of styrene, 400 parts of glycidyl methacrylate, 350 parts of 4-hydroxybutyl acrylate, 200 parts of 2-ethylhexyl acrylate and 150 parts of t-butylperoxy-2-ethyl hexanoate over 3 hours. The content was kept at 125° C. for 30 minutes, to which a mixture consisting of 10 parts of t-butylperoxy-2-ethyl hexanoate and 50 parts of xylene was added dropwise over 30 minutes. The reaction was continued at 125° C. for 2 hours to obtain a colorless transparent varnish comprising the hydroxyl and epoxy group containing polymer C-I. The polymer C-I has a solid content of 62%, a number average molecular weight of 2500, a hydroxy equivalent weight of 436 and an epoxy equivalent weight of 375.

Preparative Example 16

A reaction vessel equipped with a thermometer, a stirrer, a cooling tube, a nitrogen inlet tube and a dropping funnel, was charged with 250 parts of xylene, 500 parts of butyl acetate and heated to 125° C.

To the reaction vessel was dropwise added a monomer and initiator solution consisting of 220 parts of styrene, 320 parts of glycidyl methacrylate, 220 parts of 4-hydroxybutyl acrylate, 240 parts of 2-ethylhexyl acrylate and 150 parts of t-butylperoxy-2-ethyl hexanoate over 3 hours. The content was kept at 125° C. for 30 minutes, to which a mixture consisting of 10 parts of t-butylperoxy-2-ethyl hexanoate and 50 parts of xylene was added dropwise over 30 minutes. The reaction was continued at 125° C. for 2 hours to obtain a colorless transparent varnish comprising the hydroxyl and epoxy group containing polymer C-II. The polymer C-II has a solid content of 61%, a number average molecular weight of 2500, a hydroxy equivalent weight of 683 and an epoxy equivalent weight of 464.

Examples 1 to 14

Examples 1 to 14 illustrate coating compositions containing the polymers which were prepared in preparative examples 1 to 16.

Example 1

A resin composition was prepared by mixing the following ingredients:

| Ingredients | | Amount |
|---|---|---|
| Polymer A-I | (PEx. 1) | 100 |
| Polymer B-I | (PEx. 13) | 270 |
| Polymer C-I | (PEx. 15) | 295 |
| Tinubin-900 | | 7 |
| Sanol LS-292 | | 4 |
| Tetrabutylammonium bromide | | 3 |

The resulting composition was diluted with a solvent mixture of ethoxyethyl propionate/xylene (1/1) to a viscosity of 30sec/20° C. at No.4 ford cup. A phosphated steel panel was intercoated with Power Top U-30 (electrodeposition paint available from Nippon Paint Co., Ltd.) and Orga P-2 (intercoating paint available from Nippon Paint Co., Ltd.). It was then base-coated with a metallic base paint (Super Lack M-90 available from Nippon Paint Co., Ltd.) and then further coated with the above obtained clear coating composition in the form of wet-on-wet. The coated panel was baked at 140° C. for 30 minutes. The resulting cured coating film was evaluated as follows and the results obtained are shown in Table 3.

Evaluations (1) Solid content: Measured according to the prior art procedure, except that all coating was prepared to have a viscosity of 30sec/20° C. at No.4 ford cup.

(2) Alkali resistance: The cured coating film was contacted with 0.2 ml of a 0.1N NaOH aqueous solution at 50° C. for 2 hours. When no change was visually observed on the coating surface, the coating composition was evaluated as "Good".

(3) Acid resistance: The cured coating was contacted with 0.2 ml of a 10% $H_2SO_4$ aqueous solution at 50° C. for 2 hours. When no change was visually observed on the coating surface, the coating composition was evaluated as "Good".

(4) Mar resistance: One gram of a 50% cleanser water solution (available from Kao Corp. as New Homing Cleanser containing 87% by weight of abrasive particles, 5% by weight of surfactant and the others) was coated on a flannel fabric (2×2 cm) and attached to a fastness tester of the fraction of colored fabric (available from Daiei Kagaku Seiki K.K.)o The cured coating film was rubbed with the fabric go and back 10 times at a load of 500 g, and then 20° G gloss was measured by a gloss meter (available from Suga Shikenki K.K.) before and after rubbing, and its change was expressed by percentage. The percentage is generally related to eye evaluation according to the following criteria.

>90 No change 80 to 90 slight change but insignificant 70 to 80 Recognizable change 70>Definite change (3) XL rubbing: A cured coating film was rubbed with a fabric saturated with xylene back and forth 10 times by hand. When no change was visually observed on the coating surface, the coating composition was evaluated as "Good".

Examples 2 to 11

Clear coating compositions were prepared as generally described in Example 1, except using the compositions tabulated in the following Table 2, and the same evaluations as Example 1 were conducted. The results were shown in Table 3.

Example 12 to 14

As base coating, three compositions were prepared as generally described in Examples 1 to 3, at column 9, line 16 to column 10, line 6 of U.S. Pat. No. 5,183,504.

A phosphated steel panel was intercoated as described in Example 1, and spray-coated with each of the above mentioned three base coating composition. After per-heating at 60° C. for 5 minutes, it was coated with the clear coating composition obtained in Example 1 and then cured at 140° C. for 30 minutes. The same evaluations as Example 1 were conducted and the results are shown in Table 3.

As is shown in Table 3, the clear coating composition of the present invention has excellent acid resistance and mar resistance.

Comparative Examples 1 and 2

Clear coating compositions were prepared as generally described in example 1, except using the compositions tabulated in the following Table 2, and the same evaluation as Example 1 were conducted. The results were shown in Table 3.

TABLE 2

| Example no. | Polymer (a) | Polymer (b) | Polymer (c) | Curing cat. | Additives | |
|---|---|---|---|---|---|---|
| 1 | A-I (PEx.1) 100 | B-I (PEx.13) 270 | C-I (PEx.15) 295 | TBABr*1 3.0 | TN 900*2 7.0 | LS-292*3 4.0 |
| 2 | A-I (PEx.1) | B-II (PEx.14) | C-I (PEx.15) | TBABr | TN 900 | LS-292 |

TABLE 2-continued

| Example no. | Polymer (a) | Polymer (b) | Polymer (c) | Curing cat. | Additives | | |
|---|---|---|---|---|---|---|---|
| 3 | 100<br>A-II<br>(PEx.2) | 270<br>B-II<br>(PEx.14) | 410<br>C-I<br>(PEx.15) | 5.3<br>TBASA*4 | 5.5<br>TN 900 | 5.5<br>LS 292 | |
| 4 | 100<br>A-III<br>(PEx.3) | 270<br>B-II<br>(PEx.14) | 360<br>C-I<br>(PEx.15) | 4.5<br>TBASA | 9.0<br>TN 900 | 9.0<br>LS 292 | |
| 5 | 100<br>A-IV<br>(PEx.4) | 270<br>B-II<br>(PEx.14) | 375<br>C-I<br>(PEx.15) | 4.0<br>TBASA | 8.0<br>TN 900 | 8.0<br>LS 292 | |
| 6 | 100<br>A-V<br>(PEx.5) | 270<br>B-II<br>(PEx.14) | 375<br>C-I<br>(PEx.15) | 4.0<br>TBASA | 8.0<br>TN 900 | 8.0<br>LS 292 | |
| 7 | 100<br>A-VI<br>(PEx.6) | 270<br>B-II<br>(PEx.14) | 410<br>C-I<br>(PEx.15) | 4.5<br>TBASA | 8.0<br>TN 900 | 8.0<br>LS 292 | |
| 8 | 100<br>A-VII<br>(PEx.7) | 270<br>B-II<br>(PEx.14) | 420<br>C-I<br>(PEx.15) | 4.5<br>TBASA | 8.0<br>TN 900 | 8.0<br>LS 292 | |
| 9 | 100<br>A-VIII<br>(PEx.8) | 270<br>B-II<br>(PEx.14) | 370<br>C-II<br>(PEx.16) | 4.5<br>TBASA | 8.0<br>TN 900 | 8.0<br>LS 292 | 8.0<br>Scat 28*5 |
| 10 | 100<br>A-IX<br>(PEx.9) | 270<br>B-II<br>(PEx.14) | 500<br>C-II<br>(PEx.16) | 5.0<br>TBASA | 10.0<br>TN 900 | 10.0<br>LS 292 | 10.0<br>Scat 28 |
| 11 | 100<br>A-X<br>(PEX.10) | 270<br>B-II<br>(PEx.14) | 480<br>C-II<br>(PEx.16) | 4.5<br>TBASA | 5.0<br>TN 900 | 5.0<br>LS 292 | 9.0<br>Scat 28 |
| Comparative example 1 | — | 100<br>B-I<br>(PEx.13) | 270<br>C-I<br>(PEx.15)<br>300 | 5.0<br>TBASA<br>3.8 | 10.0<br>TN 900<br>7.0 | 10.0<br>LS 292<br>7.0 | 10.0 |
| Comparative example 2 | — | 100<br>B-I<br>(PEx.13) | 270<br>C-I<br>(PEx.15)<br>325 | 5.0<br>TBASA<br>3.8 | 10.0<br>TN 900<br>7.0 | 10.0<br>LS 292<br>7.0 | |

*1 Tetrabutylammonium bromide
*2 Tinubin 900 available from Ciba Geigy A.G.
*3 Sanol LS 292 available from Sankyo Co., Ltd.
*4 Tetrabutylammonium salicylate
*5 Available from Sankyo Yuki Gosei K.K.

TABLE 3

| Example | Solid content | XL rubbing | Alkali resist. | Acid resist. | Mar resist. |
|---|---|---|---|---|---|
| 1 | 58.0% | Good | Good | Good | 87% |
| 2 | 59.2% | Good | Good | Good | 88% |
| 3 | 57.0% | Good | Good | Good | 85% |
| 4 | 58.5% | Good | Good | Good | 83% |
| 5 | 58.3% | Good | Good | Good | 88% |
| 6 | 58.2% | Good | Good | Good | 75% |
| 7 | 57.8% | Good | Good | Good | 85% |
| 8 | 58.3% | Good | Good | Good | 83% |
| 9 | 58.2% | Good | Good | Good | 84% |
| 10 | 58.0% | Good | Good | Good | 85% |
| 11 | 58.3% | Good | Good | Good | 88% |
| 12 | 58.0% | Good | Good | Good | 87% |
| 13 | 58.0% | Good | Good | Good | 87% |
| 14 | 58.0% | Good | Good | Good | 87% |
| Comp. Ex. 1 | 47.5% | Good | Good | Good | 53% |
| 2 | 48.5% | Good | Good | Good | 47% |

What is claimed is:

1. A process for forming a coating on a substrate comprising: forming a primer coating or optionally further forming an intercoating on a substrate; coating a waterborne or solvent-borne color base paint on the primed or intercoated substrate; coating a clear paint thereon without curing the base paint layer; and baking both the base and clear coating layers to cure; an improvement being present in that the clear paint comprising a coating composition comprising the following components:

(a) from about 5 to 50% by weight of a hydroxyl and carboxyl group containing silicone polymer prepared by half esterifying:

(i) a hydroxyl group containing silicone polymer having an average of 3 to 12 hydroxyl groups per molecule of the formula:

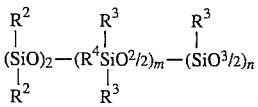

wherein, $R^1$ represents a methyl, phenyl or phenylethyl group, $R^2$ and $R^3$ each independently represents a methyl, phenyl, phenylethyl, hydroxypropyl or 3-(hydroxyethoxy)propyl group, $R^3$ represents methyl group, $R^4$ represents a methyl, 3-hydroxypropyl or 3-(hydroxyethoxy)propyl group, $R^5$ represents a methyl, phenyl, phenylethyl or isobutyl group, provided, at least one of $R^2$, $R^3$, and $R^4$ represent 3-hydroxypropyl or 3-(hydroxyethoxy)propyl group, l represents an integer or 1 to 20, m represents an integer of 2 to 4, an n represents an integer of 0 to 2; with (ii) an anhydride group containing compound; in such an amount that a molar ratio of the hydroxyl group to the anhydride group is 1/1.0 to 1/0.2;

(b) from about 20 to 60% by weight of a carboxyl and carboxylate group containing polymer prepared by reacting;

(i) an anhydride group containing polymer prepared by copolymerizing: (1) from about 15 to 40% by weight of an ethylenically unsaturated monomer having an anhydride group; and (2) from about 60 to 85% by weight of another copolymerizable ethylenically unsaturated monomer; with (ii) a hydroxyl group containing compound having 1 to 12 carbon atoms; in such an amount that a molar ratio of anhydride group to hydroxyl group is from about 1/1.5 to 1/1; and (c) from about 30 to 60% by weight of a hydroxyl and epoxy group containing polymer prepared by copolymerizing:

(i) from about 5 to 40% by weight of a hydroxyalkyl (meth)acrylate of the formula:

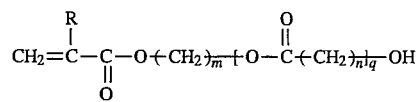

wherein, R represents a hydrogen atom or methyl group, m represents an integer of 2 to 8, n represents an integer of 3 to 7, and q represents an integer of 0 to 4;

(ii) from about 10 to 60% by weight of an ethylenically unsaturated monomer having an epoxy group; and optionally (iii) from about 0 to 85% by weight of another copolymerizable ethylenically unsaturated monomer.

* * * * *